(12) United States Patent
Sillitoe et al.

(10) Patent No.: US 11,343,334 B2
(45) Date of Patent: *May 24, 2022

(54) SOFTWARE-AS-A-SERVICE DEPLOYMENT OF PRINTING SERVICES IN A LOCAL NETWORK

(71) Applicant: PrinterLogic, Inc., St. George, UT (US)

(72) Inventors: Chad Steven Sillitoe, Washington, UT (US); Corey Clint Ercanbrack, Washington City, UT (US); Joshua Aaron Harrison, St. George, UT (US)

(73) Assignee: PrinterLogic, Inc., St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,143

(22) Filed: Mar. 2, 2021

(65) Prior Publication Data

US 2021/0185136 A1  Jun. 17, 2021

Related U.S. Application Data

(63) Continuation of application No. 16/144,564, filed on Sep. 27, 2018, now Pat. No. 10,972,553.

(Continued)

(51) Int. Cl.
*G06F 15/16* (2006.01)
*H04L 67/51* (2022.01)

(Continued)

(52) U.S. Cl.
CPC ............ *H04L 67/16* (2013.01); *G06F 8/61* (2013.01); *G06F 16/95* (2019.01);
(Continued)

(58) Field of Classification Search
CPC ....... G06F 16/95; G06F 8/61; H04L 41/0213; H04L 41/046; H04L 41/0813;
(Continued)

(56) References Cited

U.S. PATENT DOCUMENTS 6,583,888 B1  6/2003  Salgado et al.
2008/0184357 A1*  7/2008  Drako ............... H04L 63/0236
726/11

(Continued)

OTHER PUBLICATIONS

Extended European Search Report issued for European Patent Application No. 18861821.9 dated Mar. 15, 2021.

(Continued)

*Primary Examiner* — Normin Abedin
(74) *Attorney, Agent, or Firm* — Austin Rapp

(57) ABSTRACT

A method for configuring, via a website, a device to provide printing services to a local network is described. The method includes creating, via a website, a service host object that comprises a network address of a device on a local network and a service host name. The method also includes configuring, via the website, one or more printing settings for one or more printing services. The method further includes sending an indication to the device on the local network to run a service manager. The method additionally includes sending an indication to the service manager to run the one or more printing services on the local network based on the one or more printing service settings.

14 Claims, 12 Drawing Sheets

Related U.S. Application Data

(60) Provisional application No. 62/565,309, filed on Sep. 29, 2017.

(51) Int. Cl.
  *H04L 41/0813* (2022.01)
  *H04L 41/08* (2022.01)
  *H04L 67/00* (2022.01)
  *G06F 8/61* (2018.01)
  *G06F 16/95* (2019.01)
  *H04L 41/046* (2022.01)
  *H04L 41/0213* (2022.01)

(52) U.S. Cl.
  CPC ...... *H04L 41/0813* (2013.01); *H04L 41/0879* (2013.01); *H04L 41/0883* (2013.01); *H04L 67/34* (2013.01); *H04L 41/0213* (2013.01); *H04L 41/046* (2013.01)

(58) Field of Classification Search
  CPC . H04L 41/0879; H04L 41/0883; H04L 67/16; H04L 67/34
  See application file for complete search history.

(56) References Cited

U.S. PATENT DOCUMENTS

| | | | |
|---|---|---|---|
| 2010/0085599 A1* | 4/2010 | Nomura | G06F 3/1227 358/1.15 |
| 2011/0126190 A1 | 5/2011 | Urbach | |
| 2015/0142919 A1 | 5/2015 | Lee et al. | |
| 2016/0224281 A1* | 8/2016 | Yue | G06F 3/1236 |
| 2017/0228201 A1 | 8/2017 | Taylor et al. | |

OTHER PUBLICATIONS

International Search Report and Written Opinion issued for PCT Application No. PCT/US2018/053289 dated Dec. 4, 2018.
Notice of Allowance issued for U.S. Appl. No. 16/144,564 dated Dec. 1, 2020.
Office Action issued for U.S. Appl. No. 16/144,564 dated May 1, 2020.
Office Action issued for U.S. Appl. No. 16/144,564 dated Aug. 7, 2020.
Office Action issued for U.S. Appl. No. 16/144,564 dated Oct. 21, 2019.

* cited by examiner

SOFTWARE-AS-A-SERVICE DEPLOYMENT OF PRINTING SERVICES IN A LOCAL NETWORK

RELATED APPLICATIONS

This application is a continuation of U.S. patent application Ser. No. 16/144,564, filed Sep. 27, 2018 for "SOFTWARE-AS-A-SERVICE DEPLOYMENT OF PRINTING SERVICES IN A LOCAL NETWORK," which is related to and claims priority from U.S. Provisional Patent Application Ser. No. 62/565,309, filed Sep. 29, 2017 for "SOFTWARE-AS-A-SERVICE DEPLOYMENT OF PRINTING SERVICES IN A LOCAL NETWORK," which are all incorporated herein by reference.

TECHNICAL FIELD

The present disclosure generally relates to computers and computer-related technology. More specifically, the present disclosure relates to software-as-a-service (SaaS) deployment of printing services in a local network.

BACKGROUND

Computer technologies continue to advance at a rapid pace. Computers commonly used include everything from hand-held computing devices to large multi-processor computer systems. These computers include software operating systems and applications that include user interfaces to make them useful and accessible to an end user. Computers are increasingly linked with other computers and other devices, such as printers, through networks.

One increasingly prevalent model of software licensing and delivery is known as software-as-a-service (SaaS). In the SaaS model, software is centrally hosted and delivered on demand, for example, over the Internet.

DETAILED DESCRIPTION

Figure 1:
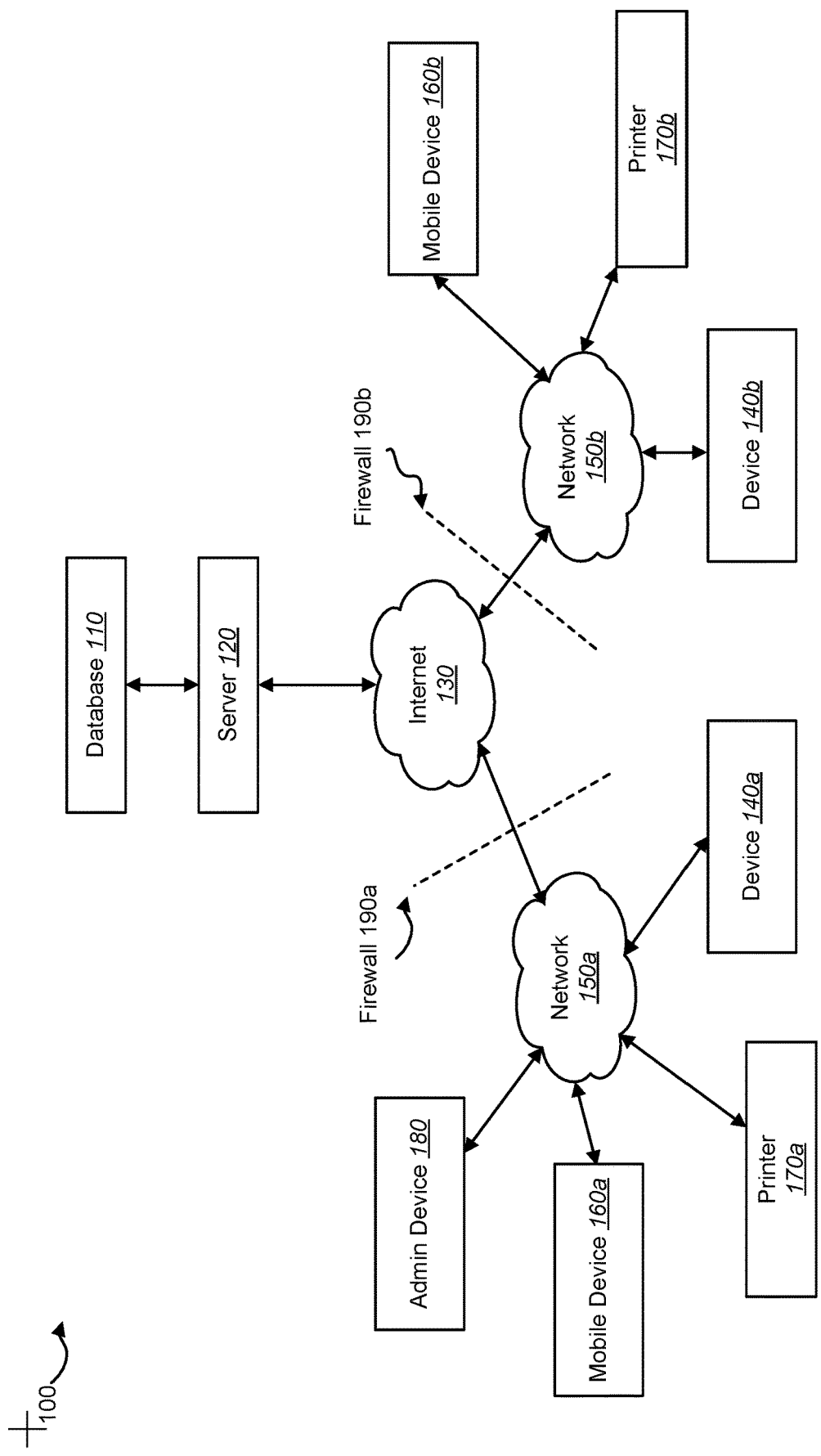
FIG. 1 is a block diagram illustrating one configuration of a system for software-as-a-service (SaaS) deployment of printing services in a local network.

A method for configuring, via a website, a device to provide printing services to a local network is described. A service host object that comprises a network address of a device on a local network and a service host name may be created via a website. One or more printing service settings for one or more printing services may be configured via the website. An indication may be sent to the device on the local network to run a service manager. An indication may be sent to the service manager to run the one or more printing services on the local network based on the one or more printing service settings.

The website may be hosted outside of the local network. The printing services may comprise one or more of an AirPrint® service, a Google Cloud Print® service, and/or an email printing service. The method may further comprise reconfiguring, via the website, the one or more settings for the printing services; and sending an indication to the service manager to run the printing services based on the one or more reconfigured settings. The method may further comprise configuring, via the website, one or more settings for one or more other services; and sending an indication to the service manager to run the one or more other services based on the one or more settings for the one or more other services. The one or more other services may comprise an authentication service, a simple network management protocol (SNMP) service, an offline internet protocol (IP) printing service, a print-job compression service, a print-job encryption service, a print-driver caching service, copy and/or scan tracking, and/or a control panel access service. Running the service manager may comprise downloading a service manager installer, and installing the service manager based on the service manager installer. A printer installer client on the device may download the service manager installer and install the service manager based on the service manager installer.

A method for providing printing services to a local network is described. An indication from a server outside a local network to run a service manager may be received at a device. An indication to run one or more printing services on the local network using one or more printing service settings for the one or more printing services may be received.

The printing services may comprise one or more of an AirPrint® service, a Google Cloud Print® service, and/or an email printing service. The method may further comprise receiving an indication to run the printing services based on one or more reconfigured settings. The method may further comprise receiving an indication to run one or more other services based on one or more settings for the one or more other services. The one or more other services may comprise an authentication service, a simple network management protocol (SNMP) service, an offline internet protocol (IP) printing service, a print-job compression service, a print-job encryption service, secure printing, pull printing, printer application install, a print-driver caching service, copy and/or scan tracking, and/or a control panel access service. Running the service manager may comprise downloading a service manager installer, and installing the service manager based on the service manager installer. A device client on the device may download the service manager installer and install the service manager based on the service manager installer.

An electronic device operable to configure, via a website, a device to provide printing services to a local network is described. The electronic device includes at least one processor that may be configured to create, via a website, a service host object that comprises a network address of a device on a local network and a service host name; configure, via the website, one or more printing service settings for one or more printing services; send an indication to the device on the local network to run a service manager; and send an indication to the service manager to run the one or more printing services on the local network based on the one or more printing service settings.

The website may be hosted outside of the local network. The printing services may comprise one or more of an AirPrint® service, a Google Cloud Print® service, and/or an email printing service. The at least one processor may be further configured to reconfigure, via the website, the one or more settings for the printing services, and send an indication to the service manager to run the printing services based on the one or more reconfigured settings. The at least one processor may be further configured to configure, via the website, one or more settings for one or more other services, and send an indication to the service manager to run the one or more other services based on the one or more settings for the one or more other services. The one or more other services may comprise an authentication service, a simple network management protocol (SNMP) service, an offline internet protocol (IP) printing service, a print-job compression service, a print-job encryption service, secure printing, pull printing, printer application install, a print-driver caching service, copy and/or scan tracking, and/or a control panel access service. The at least one processor may be further configured to download a service manager installer, and install the service manager based on the service manager installer. A printer installer client on the device may download the service manager installer and install the service manager based on the service manager installer.

An electronic device operable to provide printing services to a local network is described. The electronic device includes at least one processor that may be configured to receive, at a device, an indication from a server outside a local network to run a service manager; and receive an indication to run one or more printing services on the local network using one or more printing service settings for the one or more printing services.

The printing services may comprise one or more of an AirPrint® service, a Google Cloud Print® service, and/or an email printing service. 26. The at least one processor may be further configured to receive an indication to run the printing services based on one or more reconfigured settings. The at least one processor may be further configured to receive an indication to run one or more other services based on one or more settings for the one or more other services. The one or more other services may comprise an authentication service, a simple network management protocol (SNMP) service, an offline internet protocol (IP) printing service, a print-job compression service, a print-job encryption service, secure printing, pull printing, printer application install, a print-driver caching service, copy and/or scan tracking, and/or a control panel access service. The at least one processor may be further configured to download a service manager installer, and install the service manager based on the service manager installer. A device client on the device may download the service manager installer and install the service manager based on the service manager installer.

One of the challenges involved with computers is configuring computers to communicate with printers. Configuring computers to communicate with printers may require a technician to configure each computer individually by installing printer drivers and configuring printer profiles. Configuring mobile devices to communicate with printers may require additional configuration and hardware. This can be an expensive and time consuming. There may be additional challenges in SaaS deployment of printing services in local networks, where firewalls may impede deployment options. Accordingly, systems and methods that enable SaaS deployment of printing services in a local network may be beneficial.

Various configurations of the systems and methods are now described with reference to the Figures. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a system for software-as-a-service (SaaS) deployment of printing services in a local network. The system 100 includes server 120, devices 140*a-b*, mobile devices 160*a-b*, printers 170*a-b*, and administrative (admin) device 180. The server 120 may communicate wired or wirelessly with a database 110 to carry out various functions as described more fully below. The server 120 may communicate wired or wirelessly with devices 140*a-b*, mobile devices 160*a-b*, printers 170, and admin device 180 via the Internet 130 and networks 150*a-b*. Networks 150*a-b* may include firewalls 190*a-b* to block traffic from Internet 130 over some ports and protocols, and to and from certain destinations. Although only some databases 110, servers 120, devices 140, networks 150, mobile devices 160, printers 170, admin devices 180, and firewalls 190 are shown, the system may include any number of databases 110, servers 120, devices 140, networks 150, mobile devices 160, printers 170, admin devices 180, and firewalls 190.

In some configurations, an admin device 180 may be a desktop computer, laptop computer, tablet computer, smartphone, etc. A device 140 (e.g., devices 140*a-b*) may be a desktop computer, laptop computer, etc. A mobile device 160 (e.g., mobile devices 160*a-b*) may be a tablet, smartphone, etc. Although admin device 180, device 140, and mobile device 160 are shown as separate devices, a mobile device 180 or device 140 may carry out the functions of an admin device 180. Similarly, a mobile device 160 or admin device 180 may carry out the functions of a device 140.

In one configuration, server 120 may communicate with devices 140 through a firewall 190 protecting a network 150. Devices 140*a-b* may run a device client that may communicate with server 120 using protocols and ports that are not blocked by the firewall 190. For example, the device client may communicate with server 120 over port 443, which is typically open to allow Hyper Text Transfer Protocol Secure (HTTPS) traffic. The device client may enable server 120 to send commands to a device 140 for the device 140 to carry out on the network 150 behind the firewall 190. The server 120 may be unable to send commands to other devices 140 on the network 150 that are not running a device client. For example, the server 120 may be unable to send commands to mobile devices 160a-b that are not running a device client. The server 120 may also be unable to communicate with devices 140 and mobile devices 160 on the network 150 over ports required for some printing services and other services.

In an implementation, a network 150 may be a small network. For example, the network 150 may include fifty or fewer printers 170. In another implementation, the network 150 may belong to a large organization where the network 150 may include different subnets and may be spread across different geographic regions.

One of the challenges involved with SaaS deployment of printing services is configuring printing services on a network 150 with a firewall 190. Various printing services may exist to facilitate printing from mobile devices 160, such as Apple® AirPrint®, Google Cloud Print®, Epson® iPrint®, HP® ePrint®, email printing, etc. In a SaaS deployment involving a local network with a firewall 190, a server 120 may be unable to communicate over ports associated with these printing services. This may make it difficult to configure and deploy printing services remotely via the Internet 130 using a SaaS model. It may also be error-prone and time-consuming to configure these services individually for multiple printers 170. The systems and methods described herein may address these issues by providing for SaaS deployment of printing services in a local network.

The systems and methods described herein may be especially beneficial with smaller organizations that may have fewer than fifty printers 106 and may not have dedicated information technology (IT) staff. Benefits may also be realized by larger organizations that wish to simplify management of printing services. Additionally, SaaS deployment may be printer agnostic (i.e., include support for all printer brands and models), whereas print servers may be limited in the types of printers 170 supported. The described systems and methods provide automated configuration and deployment of printing services. This provides consistent results for deploying printing services in an organization while keeping costs and network overhead down. It may also allow a SaaS provider to offload services that are resource intensive.

Figure 2:
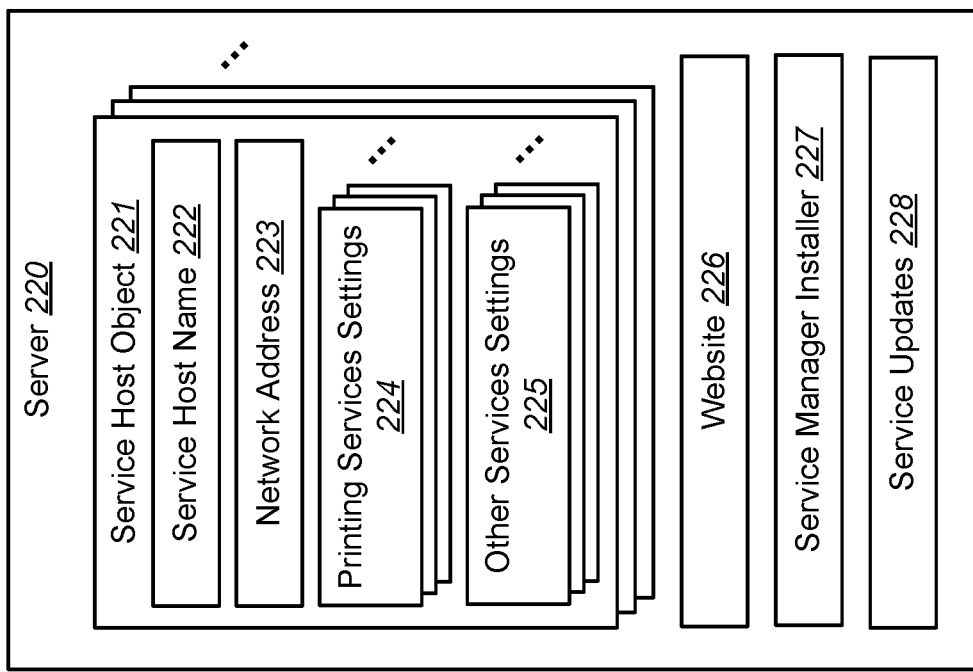
FIG. 2 is a block diagram illustrating various components of a server that may be used in one configuration of a system for SaaS deployment of printing services in a local network.

FIG. 2 is a block diagram illustrating various components of a server 220 that may be used in one configuration of a system for SaaS deployment of printing services in a local network. A server 220 may be dedicated hardware or may be a SaaS instance. For example, a server 220 may be a virtual server instance that is accessible from a public or private cloud network.

A server 220 may host a website 226 that is accessible via the Internet 130. The server 220 may include one or more service host objects 221, with each service host object 221 including a service host name 222, a network address 223 (e.g., an Internet Protocol (IP) address or hostname), one or more printing services settings 224, and one or more other services settings 225. The server 220 may further include a service manager installer 227 and service updates 228.

Service manager installer 227 may be a software program that installs a service manager on a device 140. Service updates 228 may be software programs and/or data that update the service manager on a device 140. In one configuration, a device 140 running a service manager may be referred to as a service host.

A service host object 221 may be an instantiation of a software abstraction (e.g., a class) that includes variables, data structures, and functions. A service host object 221 may be created on server 220 based on data stored in database 110. In one configuration, the data stored in the database 110 may have been created by an administrative user using website 226 accessed via the Internet 130 through a browser on an admin device 180. In one configuration, a service host object 221 may be used to execute commands, gather data, and send the data back to the website 226.

A service host object 221 may store printing services settings 224 and other services settings 225 that may be sent to a device 140 via the Internet 130. The printing services settings 224 may include settings for one or more printing services 344. For example, an email printing service may include settings for: enabling email printing, specifying a pull printer object used for processing print jobs for the service host, specifying a pull printing email address, specifying incoming mail (e.g., IMAP) settings (e.g., server, server port, username, password, security protocol, whether to ignore security certificate warnings, etc.), specifying outgoing mail (e.g., SMTP) settings (e.g., server, server port, username, password, security protocol, etc.), enabling file attachment printing, providing a path to an executable for converting file types, enabling direct email printing, enabling direct email guest printing, specifying a limit on the number of pages a guest may print, specifying whether a guest may print in color, etc. In another example, an AirPrint® service may include settings for: enabling AirPrint® printing, specifying a pull printer object to be used for processing print jobs for the service host, etc. In still another example, a Google Cloud Print® service may include settings for: enabling Google Cloud Print®, specifying a pull printer object to be used for processing print jobs for the service host, specifying a printer name, specifying whether a print job is processed locally through the service host or remotely via Google Cloud Print® to the service host, specifying Google® account authentication credentials (e.g., administrator email and password), specifying settings for a proxy server (e.g., name, port, username, password), enabling registration of the printer with Google®, etc.

In one configuration, the printing services settings 224 and other services settings 225 may be updated via website 226. A service host object 221 may also include a service host name 222 that identifies the service host object 221 and a network address that identifies a device 140 on the Internet 130 and/or network 150.

Figure 3:
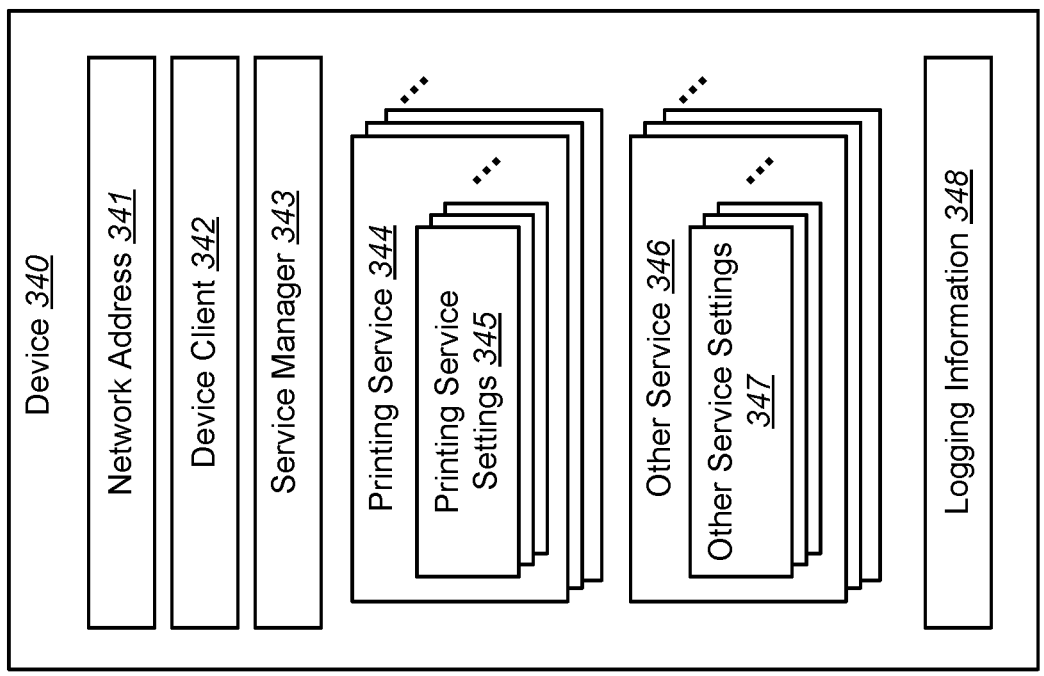
FIG. 3 is a block diagram illustrating various components of a device that may be used in one configuration of a system for SaaS deployment of printing services in a local network.

FIG. 3 is a block diagram illustrating various components of a device 340 that may be used in one configuration of a system for SaaS deployment of printing services in a local network. A device 340 may include a network address 341 (e.g., an IP address or hostname), a device client 342, a service manager 343, and logging information 348. The device client 342 may be a software program running on a device 340 that communicates with server 220 to perform actions on the device 140. The service manager 343 may manage one or more printing services 344, each printing service 344 associated with one or more printing service settings 345. A device 340 running a service manager 343 may be referred to as a service host. The service manager 343 may further manage one or more other services 346, each other service 346 associated with one or more other service settings 347. In one configuration, the service manager 343 may enable device 140 as a service host to act as a proxy or gateway for a server 220 to communicate and provide printing services on a network 150 behind a firewall 190. In some configurations, a service host may be capable of auto-scaling and syncing among multiple service hosts. In other words, a device 140 running a service manager 343 may auto-scale or sync with other devices 140 running a service manager 343 to coordinate and provide printing services 344 and other services 346 to devices 140 and mobile devices 160 on the network 150.

A service, such as a printing services 343 or an other service 346, may be a process that provides functionality beyond retrieving basic configuration information and that can operate independent of server 220. In some configurations, services may be processes that require or benefit from: running within a local network and environment; distributing resource utilization (e.g., central processing unit (CPU), memory, input-output (IO), etc.) from the server 220 to one or more nodes (i.e., one or more service hosts); processing work in a timely manner that arrives on a queue-like resource (e.g., an email inbox, Google Cloud Print® queue, etc.) between one or more nodes; providing continuous functionality even when the server 220 is unavailable or when one or more other service hosts running the same service are down; broadcasting printing services that may be used by devices 340 or mobile devices 160; collecting the status of devices 340, mobile devices 160, etc. within a local network; and/or providing authentication services to a device 340, mobile device 160, etc. Some examples of printing services 343 include an email printing service, an AirPrint® (or iOS® printing) service, a Google Cloud Print® service, etc. Some examples of other services 346 include an authentication service, a simple network messaging protocol (SNMP) service, an offline IP printing service, a print-job compression service, a print-job encryption service, a print-driver caching service, copy and/or scan tracking, a control panel access service, etc.

In one configuration, a service host may be auto-deployed and auto-scaled based on machine resources and/or external resource proximity. For example, a service may require one or more types of resources (e.g., CPU, memory, IO, special hardware, etc.) that a device 340 provides. In another example, a device 340 may be close (i.e., close in the network 150) to a printer 170, group of devices 340 and/or mobile devices 160, organization, network load, etc. In one scenario, a service may provide some benefit (e.g., decreased network traffic) when the service is running on a device 340 near the resource.

Figure 4:
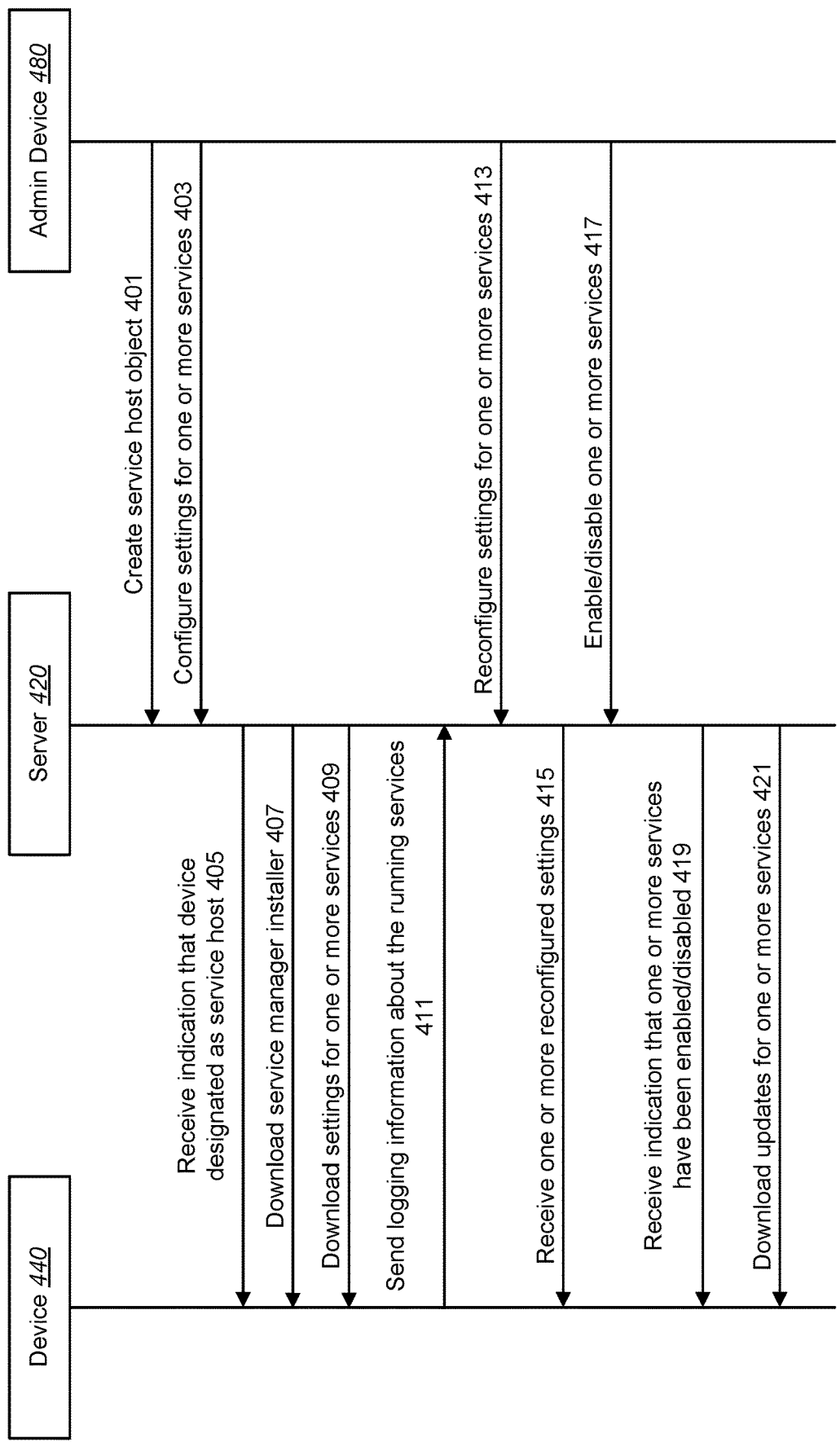
FIG. 4 is a sequence diagram illustrating communication between various devices in one configuration of a system for SaaS deployment of printing services in a local network.

FIG. 4 is a sequence diagram illustrating communication between various devices in one configuration of a system for SaaS deployment of printing services in a local network. An admin device 480 may create 401 via a website 226 a service host object 221 on server 420. The service host object 221 may be configured with a service host name 222 and a network address 223 of a device 440 running a device client 342 that will be a service host. The admin device 480 may enable or disable one or more printing services 344 and/or one or more other services 346. The admin device 480 may configure 403 one or more printing services settings 224 for the one or more printing services 344, and one or more other services settings 225 for the one or more other services 346.

A device client 342 on device 440 may communicate periodically with server 420 based on trigger events (e.g., a user logs in, manual refresh, scheduled time, a job is sent to the printer, etc.). The device client 342 may receive 405 an indication from the server 420 that device 440 has been designated as a service host. In one configuration, a determination may be made that a network address 341 (e.g., IP address, hostname, etc.) of the device 440 has been specified in a service host object 221.

The device client 342 may download 407 a service manager installer 227 and use the service manager installer 227 to install and run service manager 343. In one configuration, if the service manager 343 was previously installed, the device client 342 may communicate with server 420 to verify that the device 440 is running the latest version of the service manager 343. If the service manager 343 is the latest version, the device 440 may run the local version. If the service manager 343 is not the latest version, the device client 342 may download the latest version of the service manager installer 227 and re-install service manager 343. In another configuration, the device client 342 may check that service manager 343 is the latest version on a predetermined interval to ensure that service manager 343 is continually up-to-date.

The device client 342 may cause service manager 343 to run on device 440. The service manager 343 may download 409 one or more printing services 344 and one or more other services 346. The service manager 343 may communicate at regular intervals with server 420 to determine whether the one or more printing services 344 and one or more other services 346 have been enabled or disabled.

The device client 342 may monitor the running printing services 344 and other services 346 to ensure they are continuously running. The device client 342 may log abnormal termination of a service. The one or more printing services 344 and one or more other services 346 may maintain logs as part of their operation. The device client 342 may periodically send 411 logging information 348 (i.e., information logged by the device client 342 and/or the one or more printing services 344 and/or the other services 346) to server 420.

The one or more printing services 344 and other services 346 may communicate at regular intervals with server 420 to determine whether the one or more printing service settings 345 and other service settings 347 have been reconfigured or updated. If the one or more printing service settings 345 and one or more other service settings 347 have been reconfigured or updated, the one or more printing services 344 and the one or more other services 346 may receive updated or reconfigured settings from server 420. For example, the device 440 may download 421 updates for one or more printing services 344 and other services 346.

The admin device 480 may cause the server 420 to reconfigure 413 settings for one or more printing services 344 and other services 346. The device 440 may receive 415 one or more reconfigured settings from the server 420. The one or more printing services 344 and the one or more other services 346 may receive the reconfigured settings from server 420.

The admin device 480 may cause the server 420 to enable or disable 417 one or more printing services 344 and other services 346. The device 440 may receive 419 an indication that the 417 one or more printing services 344 and other services 346 have been enabled or disabled. The device 440 may enable or disable the one or more printing services 344 and other services 346 according to the indication received from the server 420.

The one or more printing services 344 and other services 346 may provide functionality to network 150. For example, the one or more printing services 344 may enable mobile devices 160 to print using AirPrint®, Google Cloud Print®, or email printing. In another example, the other services 346 may enable authentication, SNMP, offline IP printing, print-job compression, print-job encryption, print-driver caching, copy and/or scan tracking, and/or control panel access.

Figure 5:
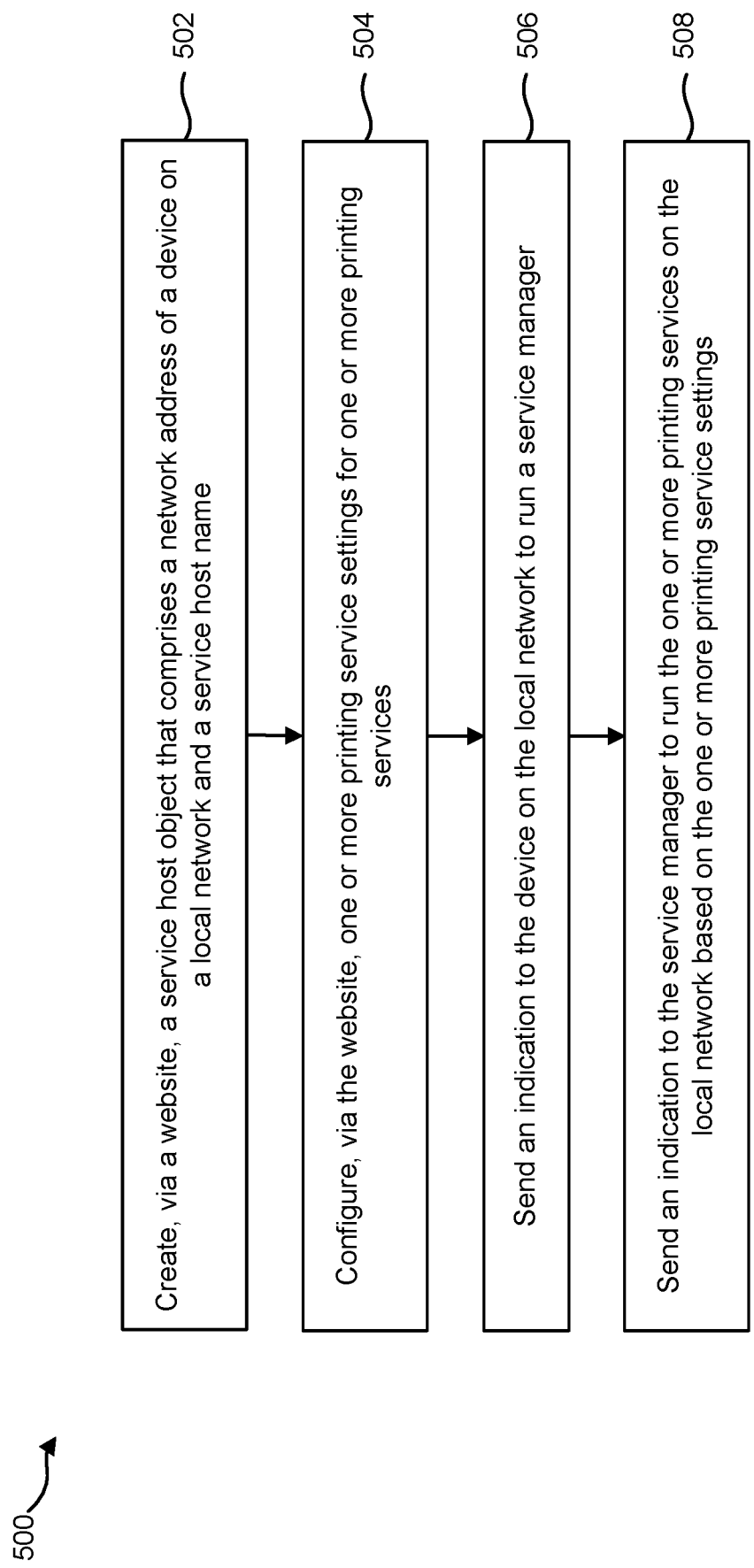
FIG. 5 is a flow diagram illustrating one configuration of a method for SaaS deployment of printing services in a local network.

FIG. 5 is a flow diagram illustrating one configuration of a method 500 for SaaS deployment of printing services in a local network. The method 500 may enable configuration, via a website 226, of a device 340 to provide printing services 344 to a local network 150. The method 500 may be implemented by a server 220 in communication with an admin device 180 and a device 140.

The server 220 may create 502, via a website 226, a service host object 221 that includes a network address 223 of a device 340 on a local network 150 and a service host name 222. The server 220 may configure 504, via the website 226, one or more printing service settings 345 for one or more printing services 344. The server 220 may send 506 an indication to the device 340 on the local network 150 to run a service manager 343. The server 220 may send 508 an indication to the service manager 343 to run printing services 344 on the local network 150 based on the one or more printing service settings 345.

Figure 6:
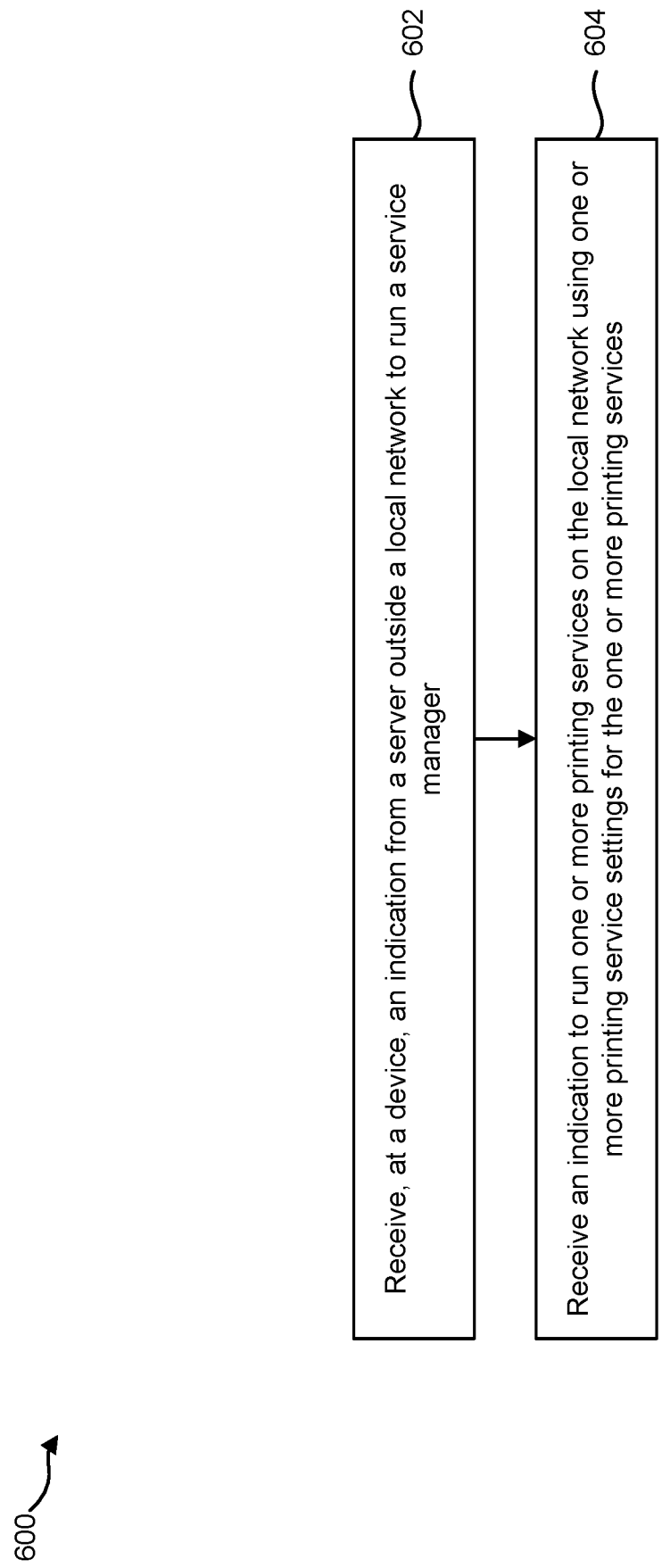
FIG. 6 is a flow diagram illustrating another configuration of a method for SaaS deployment of printing services in a local network.

FIG. 6 is a flow diagram illustrating another configuration of a method 600 for SaaS deployment of printing services in a local network. The method 600 may enable provision of printing services 344 to a local network 150. The method 600 may be implemented by a device 340 in communication with a server 220.

The device 340 may receive 602 an indication from a server 220 outside a local network 150 to run a service manager 343. The device 340 may receive 604 an indication to run one or more printing services 344 on the local network 150 using one or more printing service settings 345 for the one or more printing services 344.

Figure 7:
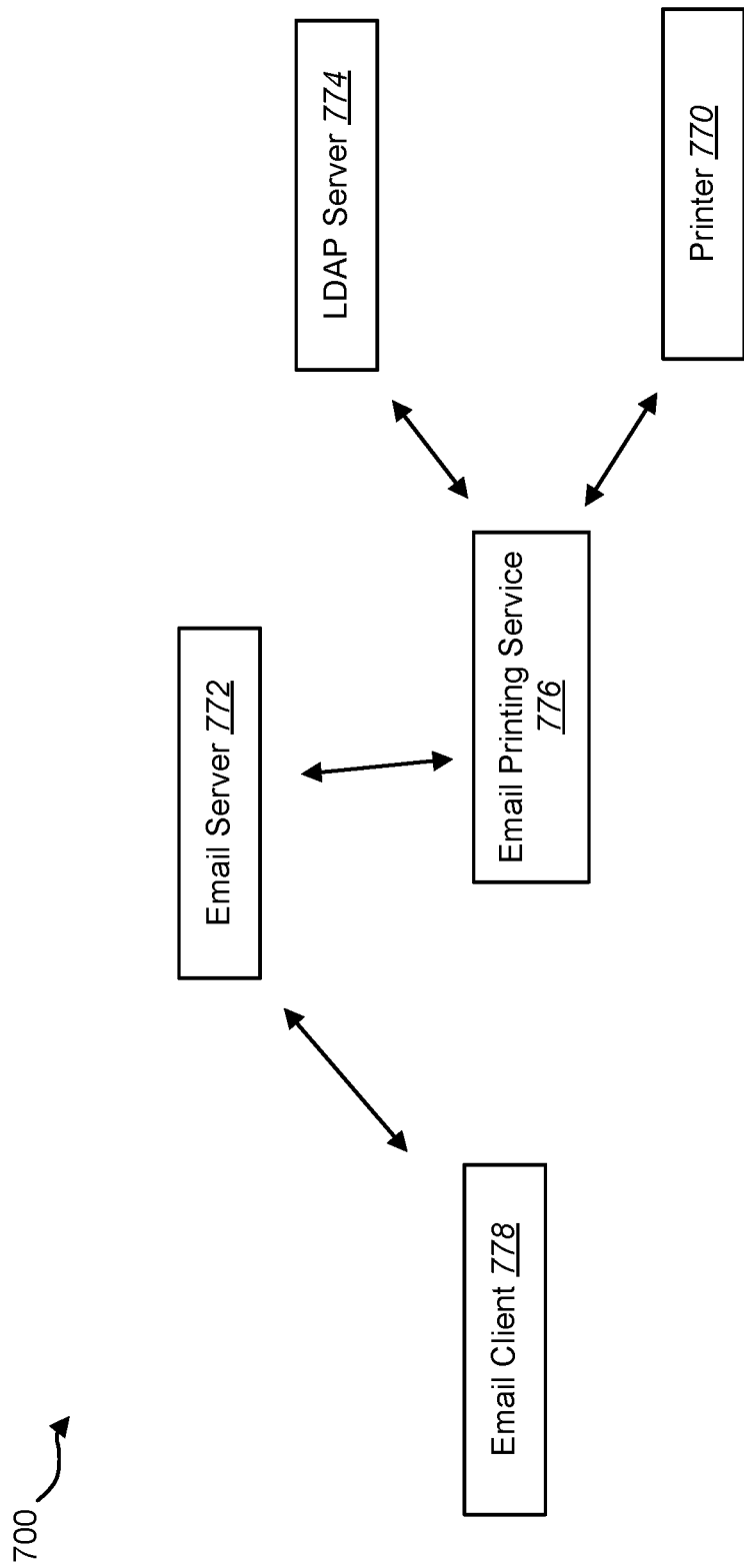
FIG. 7 is a block diagram illustrating one configuration of a system deploying an email printing service.

FIG. 7 is a block diagram illustrating one configuration of a system deploying an email printing service. The system 700 includes email client 778, email server 772, email printing service 776, lightweight directory access protocol (LDAP) server 774, and printer 770. The email printing service 776 may be hosted by a device 340 running a service manager 343. The device 340 running the service manager 343 may be referred to as a service host.

The email printing service 776 may provide functionality for printing email messages. The email printing functionality may allow email clients 778 to send email messages to an email address to be printed. In one example, the body of the email, along with supported attachment types, may each be printed as individual jobs. The user that is printing the job may be determined by querying an LDAP server 774 for one or more LDAP user attributes for the email address of the user that sent the message. This may be configured by an admin device 180 via a website 226.

In one configuration referred to as email printing, an email coming to a configured inbox may be processed and printed to a pull print queue as the user who sent the job (based on the email address queried via LDAP). The user may then release the job(s) using any available pull printing release mechanisms. In another configuration referred to as direct email printing, each printer 770 may have a direct email address configured by an admin device 180 via the website 226. The direct email address may allow users to send email messages directly to a printer 770 where the email messages will be printed immediately without the user releasing the job. In another configuration referred to as guest direct email printing, any email with a from address that is not found in LDAP server 774 may be considered a guest. When guest access is enabled via the website, guest users may send direct email jobs to printers 770. Some settings may be restricted for guest users. For example, the total number of pages per day per user, along with forcing all jobs to be printed in grayscale, may be configured.

The email printing service 776 may support text and hypertext markup language (HTML) email bodies. The email printing service 776 may further support multiple attachment types. The multiple attachment types may include: text; HTML; web images such as Graphics Interchange Format (gif), Joint Photographic Expert Group (jpeg), Portable Network Graphics (png), etc.; portable document format (PDF); and/or office documents such as those generated in Word®, Excel®, PowerPoint®, or other office software.

In one configuration of an email printing service 776, printing service settings 345 may include LDAP authentication settings for non-guest direct email printing and a service host. The service host may include settings for incoming (e.g., internet message access protocol (IMAP)) and outgoing (e.g., simple mail transfer protocol (SMTP)) email connections, guest direct email printing limits, etc.

In some configurations, an LDAP configuration may be used to identify a user sending an email message to be printed. When LDAP is used for user identification, a user attribute may include an email address that may be matched with the email address of the message sender. An email inbox may also be created for receiving print requests. For pull printing, a single email address may be used for a plurality of printers 770. For direct printing, a separate email address may be assigned to each printer 770. Other rules, such as the allowable size of an email message or spam prevention, may be configured in the email server 772.

In one example of email printing service 776, a user may send an email message from an email client 778 to a configured email address on an email server 772. The email printing service 776 may check the inbox on the email server 772 and download the new message. In one configuration, the message may be purged from the inbox.

The email printing service 776 may check LDAP server 774 for the user sending the message. When the user is not found, the user may be treated as a guest user. For guest users, when guest direct email printing is not enabled, or the daily page quota for the guest user has been reached, the message may be ignored and no further processing may take place. For authorized users, when the email address that the message was sent to does not match the pull printing email address or any email address of a printer 770 configured for direct email printing, an email response warning may be sent back and no further processing may take place.

The email printing service 776 may take the body of the email, prepend a summary header to it, and then convert the email to a PDF document. In one configuration, all attachments are converted to individual PDF documents. The email printing service 776 may send each PDF document to the printer 770 for printing as the user (i.e., the email address that the message was sent from is used for direct guest email printing). The email printing service 776 may send a response email back, via the email server 772, to the user running an email client 778. When at least one part of the email is printed, the email may contain instructions on how to release the job (for pull printing) or indicate where the job was printed to (for direct email printing). When all or any part of the email cannot be printed, a warning and an explanation of the reasons for the failure (e.g., a debugging error code) may be provided.

Figure 8:
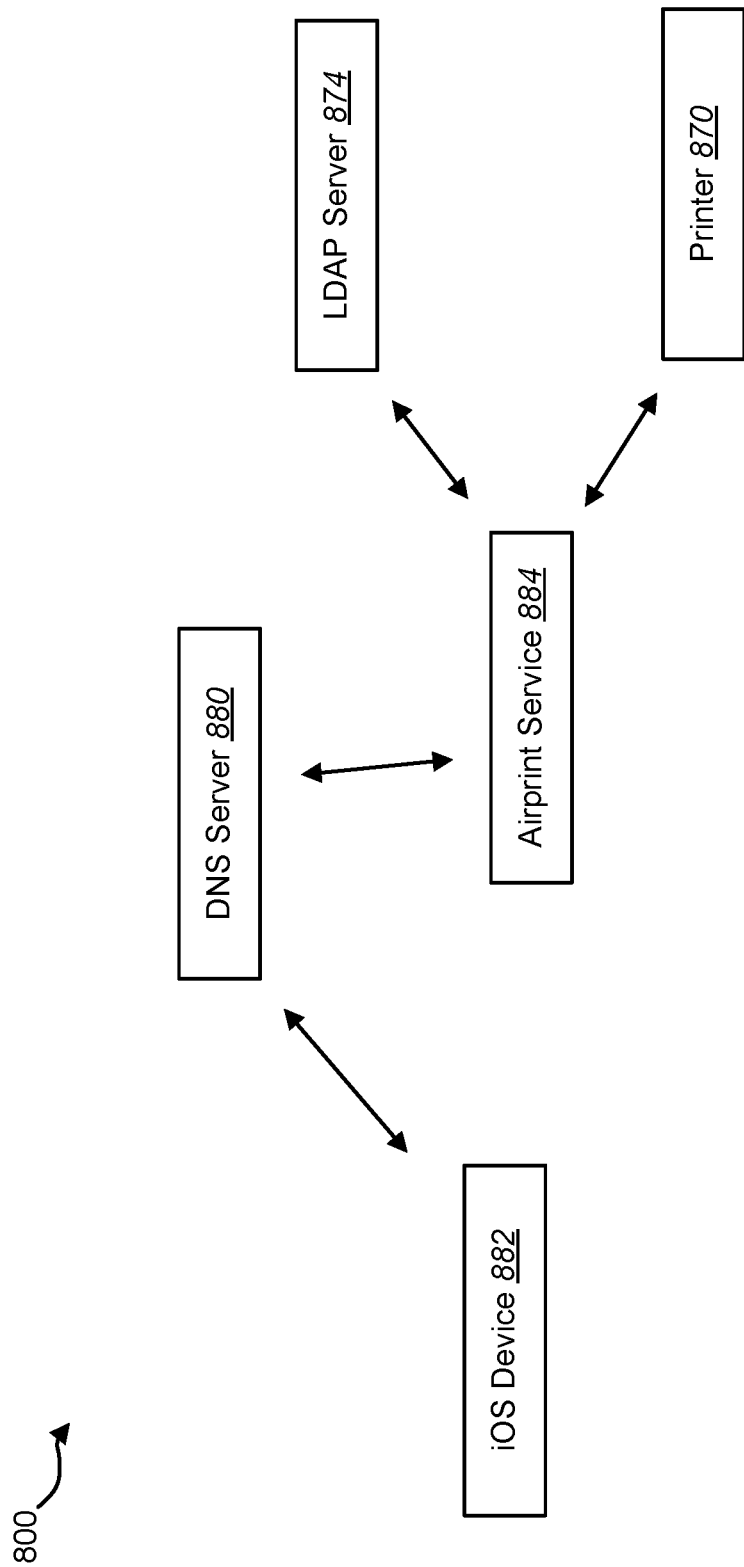
FIG. 8 is a block diagram illustrating one configuration of a system deploying an AirPrint® service.

FIG. 8 is a block diagram illustrating one configuration of a system deploying an AirPrint® service. The system 800 includes iOS device 882, domain name system (DNS) server 880, Airprint® service 884, lightweight directory access protocol (LDAP) server 874, and printer 870. The Airprint® service 884 may be hosted by a device 340 running a service manager 343. The device 340 running the service manager 343 may be referred to as a service host.

The Airprint® service 884 may provide functionality for handling print jobs from iOS® devices 882 (i.e., devices 140 and/or mobile devices 160 running the iOS® operating system). The Airprint® printing functionality may allow users to send print jobs to the pull print infrastructure using native iOS® printing. After some DNS configuration in the local environment, users may be able to find a virtual Airprint® printer in the native printing dialog of an iOS® device 882. When a user chooses to print the job, the user may be asked to enter LDAP credentials. Then, the job may be sent as a PDF document to the pull printing infrastructure for later release.

In one configuration of an Airprint® service 884, printing service settings 345 may include LDAP authentication settings and a service host. The service host may include settings for whether LDAP credentials are to be cached between print jobs or are to be provided for each print job. In some configurations, a DNS configuration may be entered to enable iOS devices 882 in the local network to find the virtual printer.

In one example of an Airprint® service 884, a user on an iOS device 882 may attempt to print using the native print dialog. The iOS device 882 may find the virtual printer advertised by the Airprint® service 884 through interaction with the DNS Server 880. The iOS® device 882 may query the Airprint® service 884 for basic capabilities.

The user may select to print their job to the virtual printer in the Airprint® service 884. The Airprint® service 884 may check for user credentials (i.e., the iOS device 882 may cache them and send them automatically). When the credentials are not provided or cannot be authenticated via LDAP server 874, the Airprint® service 884 may send an error response back to the iOS® device 882. The iOS® device 882 may prompt the user to authenticate. This may repeat until the credentials are authenticated or the user cancels printing.

The iOS® device 882 may send the print job, rendered as a PDF document, to the Airprint® service 884. The Airprint® service may print the PDF document to the pull printer 870 on behalf of the authenticated user. The job may then be ready to be released.

Figure 9:
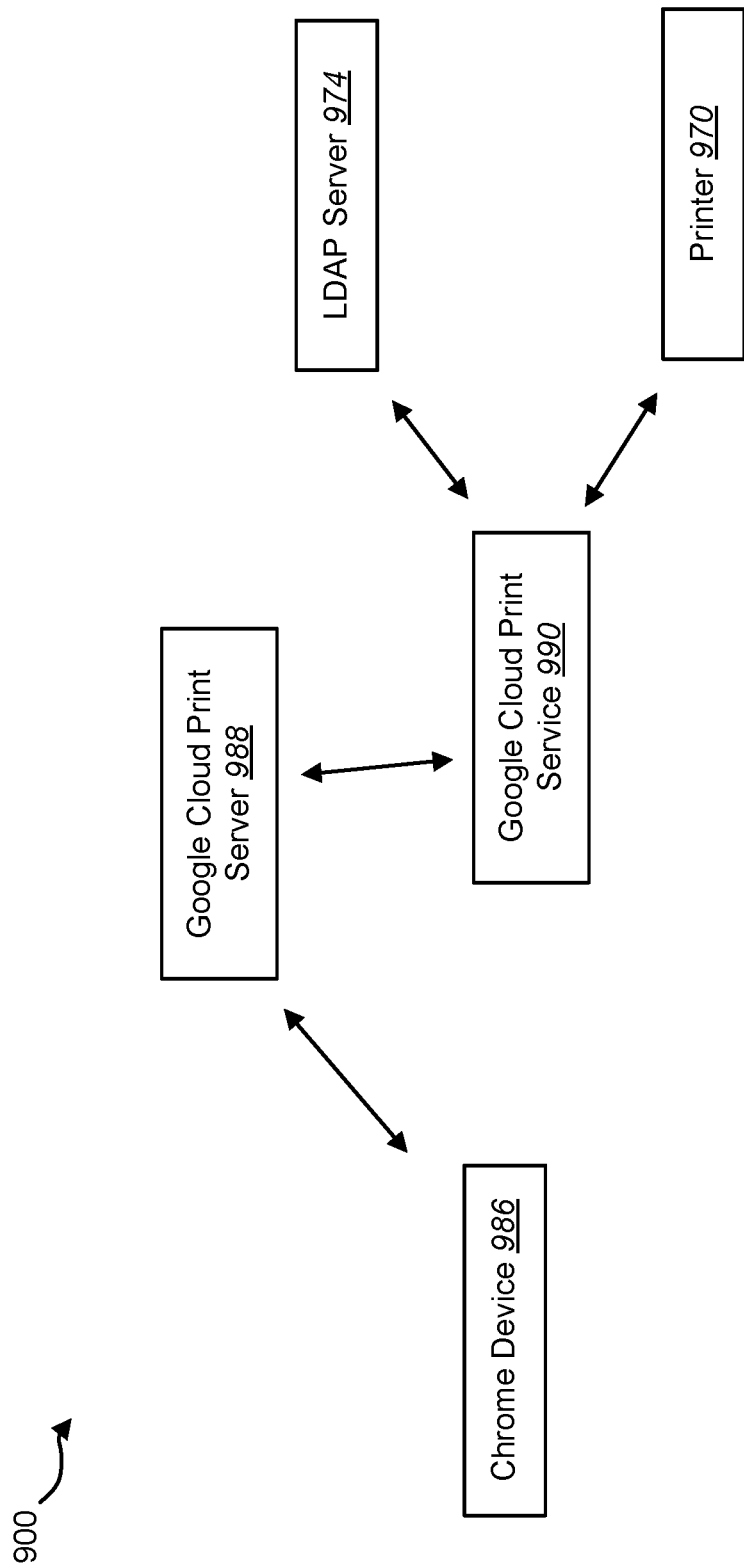
FIG. 9 is a block diagram illustrating one configuration of a system deploying a Google Cloud Print® service.

FIG. 9 is a block diagram illustrating one configuration of a system deploying a Google Cloud Print® service. The system 900 includes Chrome® device 986, Google Cloud Print® server 988, Google Cloud Print® service 990, lightweight directory access protocol (LDAP) server 974, and printer 970. The Google Cloud Print® service 990 may be hosted by a device 340 running a service manager 343. The device 340 running the service manager 343 may be referred to as a service host.

The Google Cloud Print® service 990 may provide functionality for printing documents sent to a Google Cloud Print® printer. The Google Cloud Print® service 990 may allow users to print from a Chrome® device 986 (e.g., device running Chrome® browser or Chrome® operating system). The user that is printing the job may be determined by querying the LDAP server 974 for one or more LDAP user attributes for the email address of the user that sent the message.

In one configuration referred to as traditional Google Cloud Print®, jobs may be sent from the Chrome® device 986 to a printer queue in the Google Cloud Print® server 988. The service host may download these jobs as they arrive and print them. In another configuration referred to as local Google Cloud Print®, jobs may be sent from the Chrome® device 986 directly to the service host for printing. The Google Cloud Print® printer may only be available to Google Cloud Print® clients located on the same subnet as the service host.

In one configuration of a Google Cloud Print® service 990, printing service settings 345 may include LDAP authentication settings and a service host. The LDAP authentication settings may include user email attributes. The service host may include configuration for traditional and local Google Cloud Print®. Traditional Google Cloud Print® may require a user to register a Google Cloud Print® printer in the cloud through the service host settings interface.

In some configurations, an LDAP configuration may be used to identify a user sending an email message to be printed. When LDAP is used for user identification, a user attribute may include an email address that may be matched with the email address of the message sender. In other configurations, a user may have a Google® account to create a Google Cloud Print® printer in the cloud. The customer may share this printer from the Google Cloud Print® console with other users in the organization that may use the printer.

In one example of a traditional Google Cloud Print® service, a user may print from a Chrome® device 986 to the Google Cloud Print® printer in Google Cloud Print® server 988. The Google Cloud Print® service 990 may check the Google Cloud Print® printer queue in Google Cloud Print® server 988 and download the new document. In some configurations, the document may be purged from the Google Cloud Print® server 988 printer queue. The Google Cloud Print® service 990 may check an LDAP sever 974 for the user sending the message (based on the email address of the user that sent the job). When the user is not found, the job may be discarded and no further processing may take place. When the user is found, the Google Cloud Print® service 990 may print the message to the pull printer 970 on behalf of the user.

Figure 10:
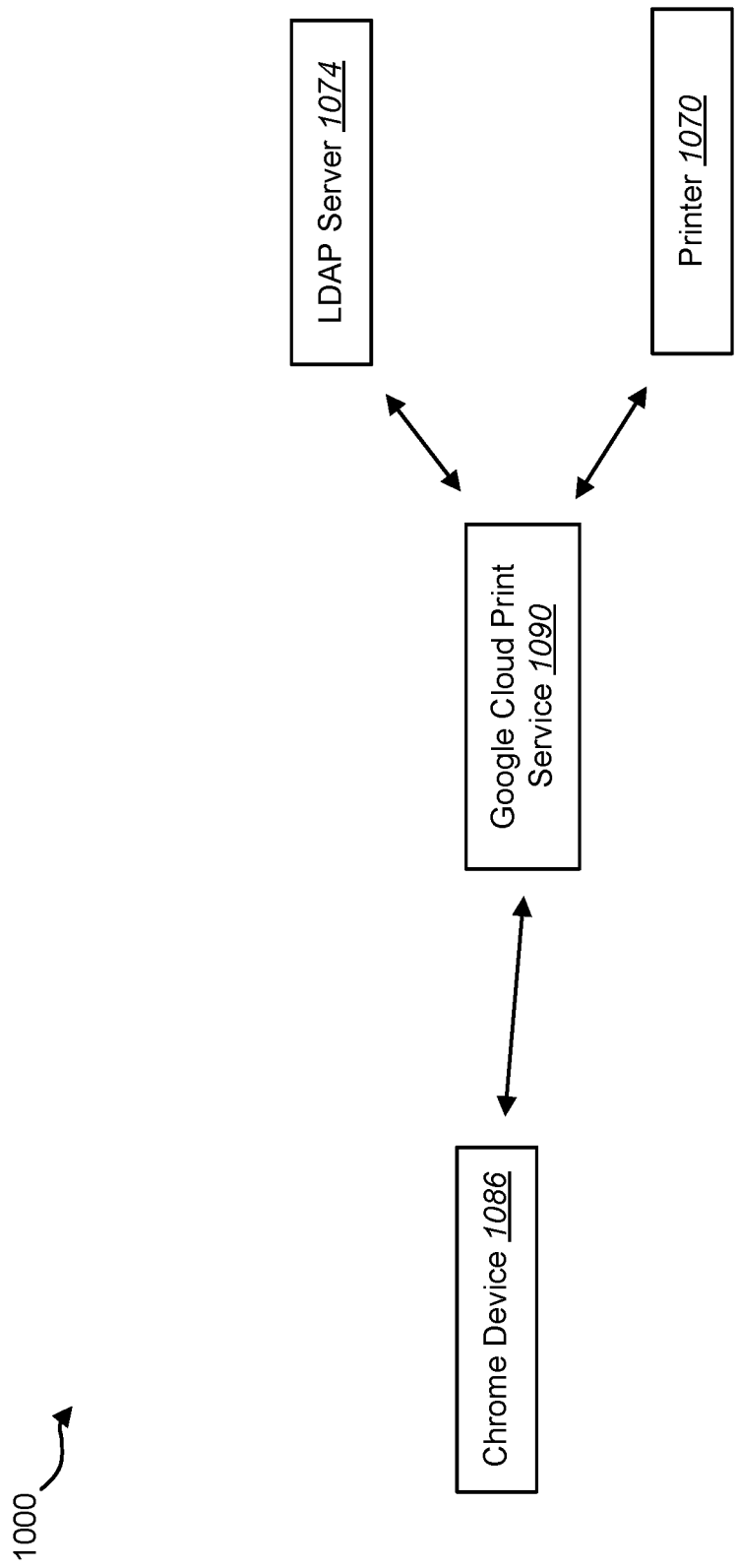
FIG. 10 is a block diagram illustrating another configuration of a system deploying a Google Cloud Print® service.

FIG. 10 is a block diagram illustrating another configuration of a system deploying a Google Cloud Print® service. The system 1000 includes Chrome® device 1086, Google Cloud Print® service 1090, lightweight directory access protocol (LDAP) server 1074, and printer 1070. The Google Cloud Print® service 1090 may be hosted by a device 340 running a service manager 343. The device 340 running the service manager 343 may be referred to as a service host.

In one example of a local Google Cloud Print® service 1090, a user may print from a Chrome® device 1086 to a Google Cloud Print® printer advertised by the Google Cloud Print® service 1090. The Google Cloud Print® service 1090 may receive the document and check an LDAP server 1074 for the user sending the message (based on the email address of the user that sent the job). When the user is not found, the job may be discarded and no further processing may take place. When the user is found, the Google Cloud Print® service 1090 may print the message to the pull printer 1070 on behalf of the user.

Figure 11:
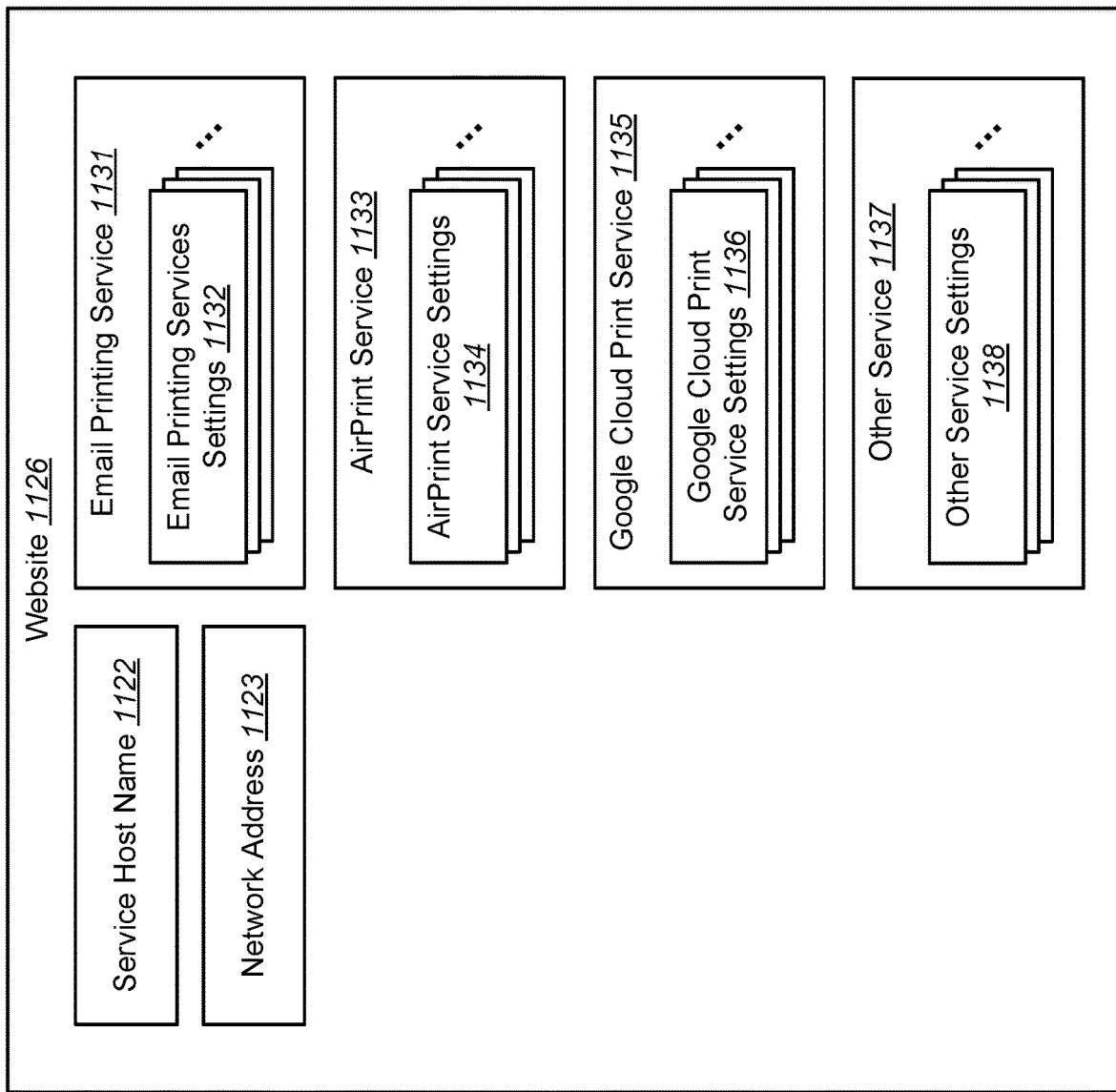
FIG. 11 is a block diagram illustrating one configuration of a website for SaaS deployment of printing services in a local network.

FIG. 11 is a block diagram illustrating one configuration of a website for SaaS deployment of printing services in a local network. The website 1126 may be hosted by a server 220 and generated dynamically based on data in database 110. The website 1126 may be accessible via the Internet 130.

The website 1126 may display one or more webpages and/or dialog boxes. A service provider may access the website 1126 to enter information about a printer 106 and provide one or more printer drivers 1124 and one or more printer profiles 1128.

The website 1126 may provide one or more webpages for configuring a service manager 343 on a device 340 to run one or more printing services 344 based on one or more printing service settings. In one configuration, the website 1126 may provide a webpage with an interface element (e.g., textbox) for inputting a service host name 1122 and an interface element for inputting a network address 1123. The service host name 1122 may enable an administrative user to identify and distinguish configuration information for one or more service managers 343.

In one configuration, the website 1126 may provide a webpage for configuring an email printing service 1131. The webpage may include interface elements (e.g., textbox, dropdown menu, radio buttons, check boxes, etc.) for configuring one or more email printing service settings 1132.

In another configuration, the website 1126 may provide a webpage for configuring an AirPrint® service 1133. The webpage may include interface elements (e.g., textbox, dropdown menu, radio buttons, check boxes, etc.) for configuring one or more AirPrint® service settings 1134.

In still another configuration, the website 1126 may provide a webpage for configuring a Google Cloud Print® service 1135. The webpage may include interface elements (e.g., textbox, dropdown menu, radio buttons, check boxes, etc.) for configuring one or more Google Cloud Print® service settings 1136.

In another configuration (not shown), the website 1126 may provide a webpage for configuring another printing service 344, such as HP® ePrint®, Epson® iPrint®, etc. The webpage may include interface elements (e.g., textbox, dropdown menu, radio buttons, check boxes, etc.) for configuring one or more other printing service settings 345.

In yet another configuration, the website 1126 may provide a webpage for configuring an other service 1137, such as an authentication service, a SNMP service, an offline IP printing service, a print-job compression service, a print-job encryption service, a print-driver caching service, copy and/or scan tracking, and/or a control panel access service. The webpage may include interface elements (e.g., textbox, dropdown menu, radio buttons, check boxes, etc.) for configuring one or more other service settings 1138.

Figure 12:
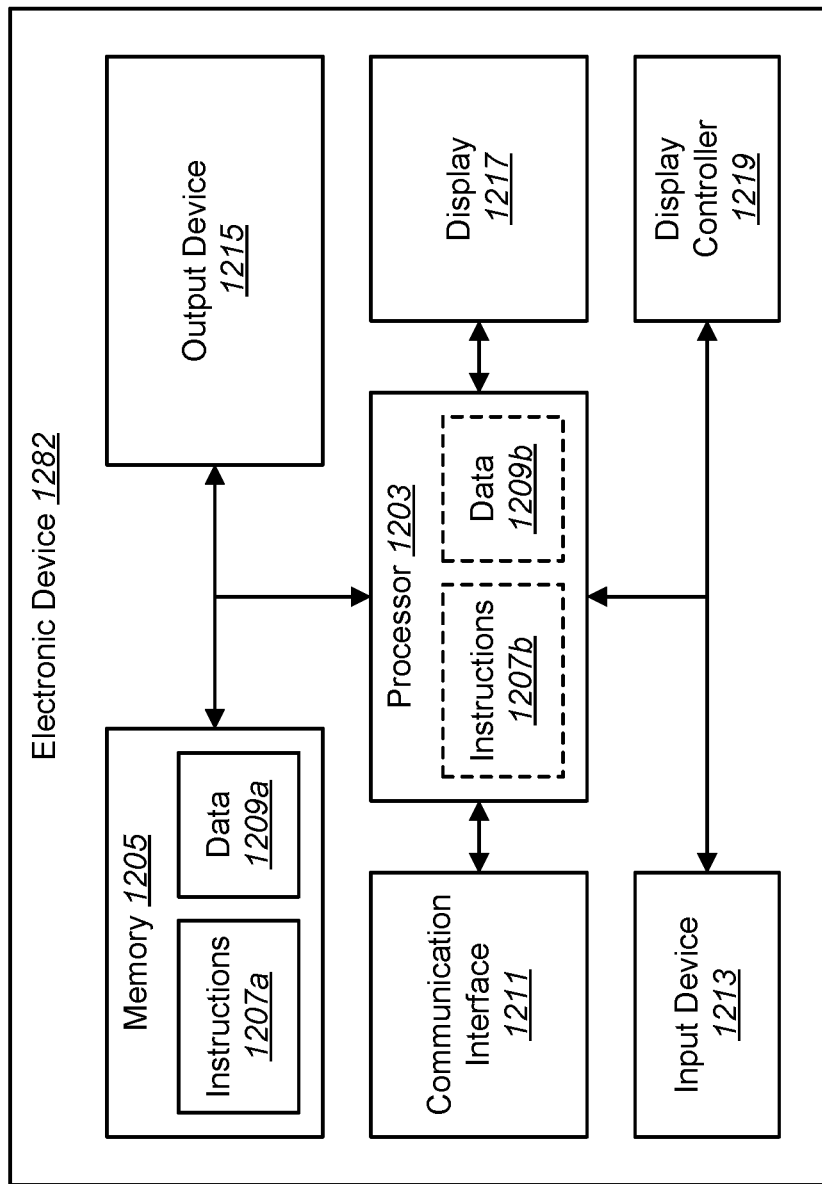
FIG. 12 illustrates various components that may be utilized in an electronic device.

FIG. 12 illustrates various components that may be utilized in an electronic device 1282. The electronic device 1282 may be configured in accordance with one or more of the servers 120, admin devices 180, devices 140, and mobile devices 160 described herein.

The electronic device 1282 may include a processor 1203 and memory 1205. The memory 1205 may include instructions 1207a and data 1209a. The processor 1203 controls the operation of the computing device and may be, for example, a microprocessor, a microcontroller, a digital signal processor (DSP), or another device known in the art. The processor 1203 typically performs logical and arithmetic operations based on program instructions 1207b and/or data 1209b received from the memory 1205.

The electronic device 1282 typically may include one or more communication interfaces 1211 for communicating with other electronic devices. The communication interfaces 1211 may be based on wired communication technology, wireless communication technology or both. Examples of different types of communication interfaces 1211 include a serial port, a parallel port, a Universal Serial Bus (USB), an Ethernet adapter, an Institute of Electrical and Electronics Engineers (IEEE) bus interface, a small computer system interface (SCSI) bus interface, an infrared (IR) communication port, a Bluetooth wireless communication adapter, and so forth.

The electronic device 1282 typically may include one or more input devices 1213 and one or more output devices 1215. Examples of different kinds of input devices 1213 include a keyboard, mouse, microphone, remote control device, button, joystick, trackball, touchpad, lightpen, etc. Examples of different kinds of output devices 1215 include a speaker, printer, etc. One specific type of output device 1215 that may be included in a computer system is a display device 1217. Display devices 1217 used with configurations disclosed herein may utilize any suitable image projection technology, such as liquid crystal display (LCD), light-emitting diode (LED), gas plasma, electroluminescence, a cathode ray tube (CRT), or the like.

A display controller 1219 may also be provided, for converting data 1209a stored in the memory 1205 into text, graphics, and/or moving images (as appropriate) shown on the display device 1217. Of course, FIG. 12 illustrates only one possible configuration of an electronic device 1282. Various other architectures and components may be utilized.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, removable flash drives or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for configuring, via a website, a device to provide printing services to a local network, comprising:
   creating, via a website, a service host object that comprises a network address of a device on a local network and a service host name, wherein the website is hosted by a server located behind a firewall blocking network traffic from the local network;
   configuring, via the website, one or more printing service settings for one or more printing services; and
   sending an indication to run the one or more printing services on the local network based on the one or more printing service settings, wherein the one or more printing services communicate at regular intervals with the server to determine whether the printing service settings have been reconfigured or updated.

2. The method of claim 1, wherein the website is hosted outside of the local network.

3. The method of claim 1, wherein the printing services comprise one or more of an AirPrint service, a Google Cloud Print service, and/or an email printing service.

4. The method of claim 1, further comprising:
   reconfiguring, via the website, the one or more settings for the printing services; and
   sending an indication to run the printing services based on the one or more reconfigured settings.

5. The method of claim 1, further comprising:
   configuring, via the website, one or more settings for one or more other services; and
   sending an indication to run the one or more other services based on the one or more settings for the one or more other services.

6. The method of claim 5, wherein the one or more other services comprise an authentication service, a simple network management protocol (SNMP) service, an offline internet protocol (IP) printing service, a print-job compression service, a print-job encryption service, a print-driver caching service, copy tracking, scan tracking, and/or a control panel access service.

7. An electronic device operable to configure, via a website, a device to provide printing services to a local network, comprising:
   at least one processor configured to:
   create, via a website, a service host object that comprises a network address of a device on a local network and a service host name, wherein the website is hosted by the electronic device located behind a firewall blocking network traffic from the local network;
   configure, via the website, one or more printing service settings for one or more printing services; and
   send an indication to run the one or more printing services on the local network based on the one or more printing service settings, wherein the one or more printing services communicate at regular intervals with the electronic device to determine whether the printing service settings have been reconfigured or updated.

8. The electronic device of claim 7, wherein the website is hosted outside of the local network.

9. The electronic device of claim 7, wherein the printing services comprise one or more of an AirPrint service, a Google Cloud Print service, and/or an email printing service.

10. The electronic device of claim 7, wherein the at least one processor is further configured to:
    reconfigure, via the website, the one or more settings for the printing services; and
    send an indication to run the printing services based on the one or more reconfigured settings.

11. The electronic device of claim 7, wherein the at least one processor is further configured to:
    configure, via the website, one or more settings for one or more other services; and
    send an indication to run the one or more other services based on the one or more settings for the one or more other services.

12. The electronic device of claim 11, wherein the one or more other services comprise an authentication service, a simple network management protocol (SNMP) service, an offline internet protocol (IP) printing service, a print-job compression service, a print-job encryption service, secure printing, pull printing, printer application install, a print-driver caching service, copy tracking, scan tracking, and/or a control panel access service.

13. The electronic device of claim 7, wherein the at least one processor is further configured to:

download a service manager installer; and install a service manager based on the service manager installer.

14. The electronic device of claim 13, wherein a printer installer client on the device downloads the service manager installer and installs the service manager based on the service manager installer.

\* \* \* \* \*